United States Patent [19]

Kawabata

[11] Patent Number: 5,658,093
[45] Date of Patent: Aug. 19, 1997

[54] PROCESS FOR REMEDYING AN ENVIRONMENT USING MICROORGANISM AND A PROCESS FOR TREATING SOIL

[75] Inventor: Yuji Kawabata, Isehara, Japan

[73] Assignee: Canon Kabushiki Kaisha, Tokyo, Japan

[21] Appl. No.: 570,735

[22] Filed: Dec. 12, 1995

[30] Foreign Application Priority Data

Dec. 12, 1994 [JP] Japan .................................. 6-307273

[51] Int. Cl.$^6$ .................. A62D 3/00; B09C 1/08
[52] U.S. Cl. .................. 405/128; 166/246; 405/263; 405/264; 435/262.5
[58] Field of Search .................. 405/128, 263, 405/264; 166/246, 292; 435/262.5; 210/747

[56] References Cited

U.S. PATENT DOCUMENTS

| | | | |
|---|---|---|---|
| 3,749,171 | 7/1973 | Marx | 166/274 |
| 4,442,895 | 4/1984 | Lagus et al. | 166/250 |
| 4,637,759 | 1/1987 | Owa et al. | 405/270 |
| 4,690,589 | 9/1987 | Owa | 405/263 |
| 5,032,042 | 7/1991 | Schuring et al. | 405/258 |
| 5,061,119 | 10/1991 | Balthaus et al. | 405/128 |
| 5,111,883 | 5/1992 | Savery | 166/269 |
| 5,133,625 | 7/1992 | Albergo et al. | 405/263 |
| 5,249,888 | 10/1993 | Braithwaite et al. | 405/128 |
| 5,288,169 | 2/1994 | Neeper | 405/128 |
| 5,299,638 | 4/1994 | Cheneviere et al. | 166/246 |
| 5,351,757 | 10/1994 | Chou et al. | 166/270 |
| 5,456,550 | 10/1995 | Devlin | 405/128 |

FOREIGN PATENT DOCUMENTS

| | | |
|---|---|---|
| 2-26662 | 6/1990 | Japan . |
| 5-27676 | 4/1993 | Japan . |

OTHER PUBLICATIONS

Shields, Malcolm S., et al., "Selection of a *Pseudomonas cepacia* Strain Constitutive for the degradation of Trichloro Ethylene", *Applied and Environmental Microbiology*, Dec. 1992, vol. 58, No. 12, pp. 3977–3983.

Primary Examiner—George A. Suchfield
Attorney, Agent, or Firm—Fitzpatrick, Cella, Harper & Scinto

[57] ABSTRACT

A process for microbial remediation of soil polluted with a pollutant by introducing into the polluted soil a decomposing microorganism, a nutrient and/or an inducer necessary for the expression of a decomposing activity in the microorganism, wherein a coefficient of permeability of the polluted soil is controlled to be small and uniform so that the introduced substance may be uniformly distributed over a soil area to be remedied. Also a process for treating soil which comprises a step of controlling the coefficient of permeability of the soil so that a peak at the substantially smallest coefficient of permeability may comprise the largest percentage in the distribution of coefficient of permeability.

27 Claims, 2 Drawing Sheets

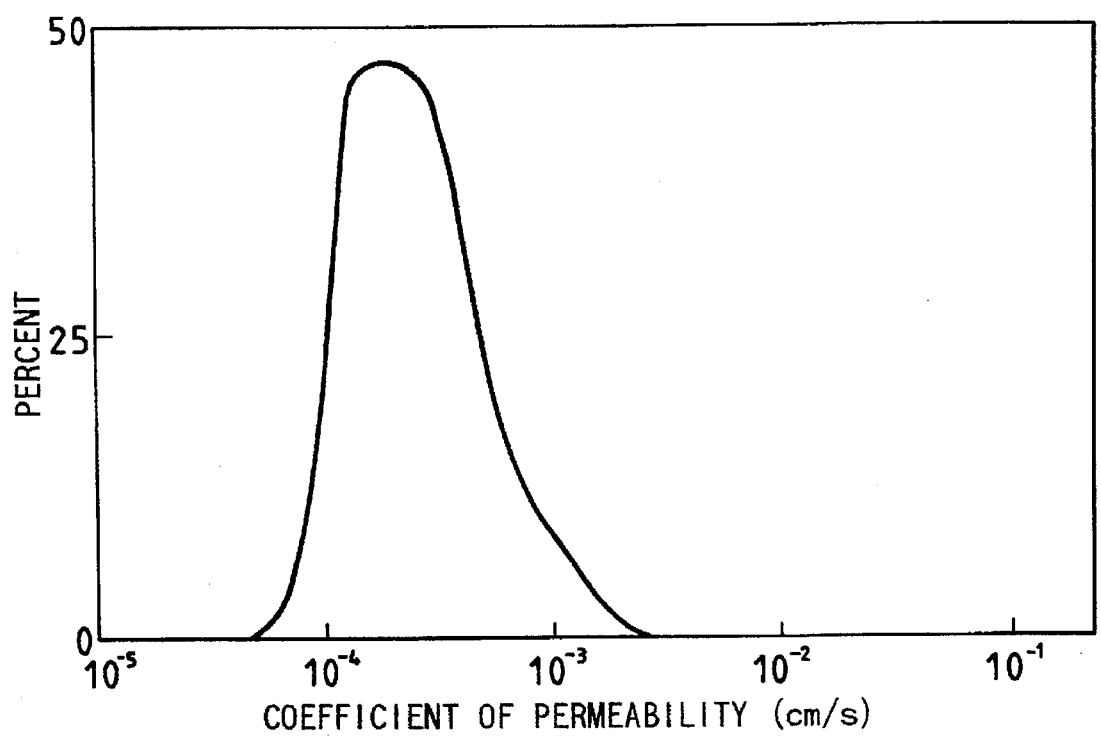

PROCESS FOR REMEDYING AN ENVIRONMENT USING MICROORGANISM AND A PROCESS FOR TREATING SOIL

BACKGROUND OF THE INVENTION

1. Field of the Invention

This invention relates to a process for microbial remediation of polluted soil using a microorganism and also a process for treating soil.

2. Related Background Art

With the rapid progress of science and technology, man has been enjoying a living environment in various senses, for example, travelling means, communication means etc., not to mention food, clothing and housing. On the other hand, the natural environment including atmosphere, hydrosphere, and terrestrial zone has been gradually but globally destroyed by scientific and technological results such as exhaust gas of fossil fuel, artificial chemical materials or synthetic compounds and so on. Land has been most affected by those destructive elements because it is the living place for man. Considering that water circulates from land to air and vice versa, it can be said that the terrestrial pollution which will eventually expand to the global level is a serious problem. The now well-known pollutants in soil (land) include, for example, hydrocarbons like gasoline, hydrocarbon halides like PCB, agricultural chemicals having teratogenic activity like dioxin, radioactive compounds and so on. Above all organic compounds are utilized in great quantity as, for example, motor gasoline, detergent solvent for precision mechanical parts, solvent for dry cleaning, and chemicals for insecticides and herbicides. Even now, the pollution of soil with these compounds is in progress. Further it has been found that some organic compound pollutants are strong carcinogens, so that they have grave influence on the biological world. Thus pollution of soil with organic compounds is the problem which should be solved without a moment's delay.

The processes for remedying soil polluted with organic compounds include, for example, a method to heat the excavated soil, a method to conduct vacuum extraction, a method to utilize microorganisms capable of decomposing pollutants, and so on. Heating treatment can remove the pollutant almost completely from the soil. It is, however, not applicable to the purification of the soil under buildings because such soil cannot be dug up. In addition, it is not applicable to the purification of the soil in a wide area, because soil excavation and heating treatment cost comparatively high. Vacuum extraction is low in cost and easy to handle. It, however, requires a very long time to decrease the concentration of pollutants, when the concentration of pollutants in soil is low. Thus it is advantageously used when the concentration of pollutants in soil is high. When utilizing a process which uses microorganism, on the other hand, it is easy to purify the soil under buildings because there is no need to excavate of the soil. Moreover, if microorganisms having a high activity of decomposing pollutants are employed, the purification of polluted soil can be done within a short time even when the concentration of organic compounds is low. Thus this process is now attracting considerable attention as an eco-friendly process.

Conventionally, processes for purifying polluted soil with microorganism have been classified into two types; one is those utilizing native microorganisms which originally inhabit the soil, and the other is those utilizing foreign microorganisms which do not originally inhabit the soil. When the former processes are employed, purification is conducted by injecting the soil with such substances as nutrient, inducer, oxygen and other chemicals to increase the decomposing activity of the microorganism. When the latter are employed, purification includes the step of introducing into the soil foreign microorganism as well as the step of injecting the soil with nutrient and so on which heightens the decomposing activity of the microorganism. When a polluted soil is purified using microorganism, it is desirable that decomposing activity of microorganism be kept high in the wide area of the soil for a long period of time, which is, however, hard to accomplish by the present technique of controlling microorganism. Considering all the factors such as cost, time, safety and so on, the most efficient process for purifying soil is to limit the area to be remedied and to control the decomposing activity of microorganism within the limited area.

One of the prior arts related to the above is U.S. Pat. No. 5,133,625 which describes the method of controlling injection pressure using an extensible injection pipe while measuring injection pressure, flow rate and temperature. This method aims to keep decomposing activity of microorganism optimum by controlling the concentration of the microorganism and nutrients by adjusting the injection pressure. In other words, the object of the prior art is to provide a method for controlling the purification process which utilizes microorganism.

U.S. Pat. No. 4,442,895 and U.S. Pat. No. 5,032,042 disclose the method where the soil is cracked by injecting a gas or a liquid from an injection well by applying pressure, and it says that oxygen and nutrients required for microbial purification can be supplied in this step. The object of this prior art is to provide a process for cracking soil as wide as possible, but not to limit the area to be remedied. U.S. Pat. No. 5,111,883 discloses the method of injecting liquid chemicals into the soil at horizontally and vertically determined sites by setting the relative position of injection well and extraction well. This method aims to provide a process for injecting liquid chemicals into a limited area of the soil in a geometrical manner. It is considered as a very useful method when applied to microbial purification of soil because it can define the area of the soil to be remedied. The problem of the method, however, is that structure of the equipment is very complex.

In order to inject microorganism or substances for maintaining high decomposing activity of the microorganism into a limited area of soil, one of the methods is to form an impermeable layer as a barrier in the soil at a certain distance from the injection well. Conventionally known methods to form such an impermeable layer include laying plastic sheets or forming an asphalt layer in the soil, and injecting the soil with a treating agent such as cement, water-glass, urethane, acrylic amide, acrylate and so on. Japanese Patent Publications No. 2-26662 and No. 5-27676 disclose a method of forming an impermeable layer in a certain soil area using a water soluble polymer which turns water insoluble due to the ions in the soil. This method provides an impermeable layer as a barrier which limits the movement of substances and could be applicable to the process for injecting microorganism and nutrients into the limited area of the soil. Laying plastic sheets and forming asphalt layer in the soil, however, are incompatible with the aim in utilizing microorganism for remedying polluted soil because digging up and returning of soil are required. The process for injecting soil with treating agents such as cement and water soluble polymers requires many injection wells to form a complete barrier, therefore it is not applicable to the microbial remediation of soil for an economical reason. When a foreign microorganism is injected into the soil, the uniform distribution of the microorganism would be very difficult in the soil even using the above technique. Accordingly, an excessive amount of microorganism must be injected so that the polluted soil may be satisfactorily remedied even at the part where the injected microorganism is most difficult to distribute. This leads to an increase in cost of polluted soil remediation.

SUMMARY OF THE INVENTION

In view of the above problems, an object of the present invention is to provide a process for microbial remediation of polluted soil wherein a microorganism and other substances injected into an area of soil to be remedied are uniformly distributed over the area so as to enable efficient and satisfactory remediation.

Another object of the present invention is to provide a process for treating soil which enables uniform distribution of the injected substances in an area of soil to be remedied.

According to one aspect of the invention, we provide a process for remedying an environment comprising soil polluted with a pollutant using a microorganism by introducing into the polluted soil a substance selected from the group consisting of a microorganism capable of decomposing the pollutant, a nutrient for a microorganism capable of decomposing the pollutant and an inducer for expressing an activity for decomposing the pollutant in a microorganism capable of decomposing the pollutant, the process comprising controlling a coefficient of permeability of the polluted soil so that the substance introduced into the soil may be uniformly distributed over a soil area to be remedied.

According to another aspect of the invention, we provide a process for microbial remediation of polluted soil comprising the steps of:
providing an area of soil containing the polluted soil to be remedied and having plural peaks in its coefficient of permeability distribution;
controlling the coefficient of permeability of the soil so that the peak of substantially minimum coefficient of permeability may comprise the largest percentage in the distribution of coefficient of permeability of the soil; and
supplying at least one of such substances as a microorganism capable of decomposing the pollutant, a nutrient for a microorganism capable of decomposing the pollutant, and an inducer for expressing an activity for decomposing the pollutant in a microorganism capable of decomposing the pollutant to the soil of which coefficient of permeability has been already controlled.

According to another aspect of the invention, we provide a process for treating soil comprising the steps of:
providing an area of soil containing the polluted soil to be remedied and having plural peaks in its coefficient of permeability distribution; and
controlling the coefficient of permeability of the soil so that the peak at substantially the smallest coefficient of permeability comprises the largest percentage in the distribution of coefficient of permeability of the soil.

After studying the above-mentioned problems from various points, the applicants of the present invention discovered that the distribution of the substances injected into soil depends on the liquid permeability of the soil, or coefficient of permeability, and that the distribution of the substances injected into soil is not uniform when the soil has various coefficients of water permeability. The present invention has been made based on these discoveries.

According to one aspect of the present invention, polluted soil can be remedied very efficiently.

According to another aspect of the present invention, the ecosystem of the area which does not need remediation is not disturbed by foreign substances injected into a soil area to be remedied, because the present invention can control the diffusion extent of the substance injected into the soil.

BRIEF DESCRIPTION OF THE DRAWINGS

FIG. 3 is a graph which shows the distribution of controlled coefficient of permeability of the soil after processing in Example 4.

DETAILED DESCRIPTION OF THE INVENTION

Hereinafter the present invention will be described in detail.

When a liquid containing such substances as a microorganism, nutrients and so on is injected into soil by applying pressure, the diffusion extent of the injected material mostly depends on the coefficient of permeability of the soil. The coefficient of permeability of the soil, however, generally differs from site to site, and therefore the injected liquid does not diffuse uniformly, but toward the parts having higher coefficient of permeability. Therefore, the coefficient of permeability of the soil is made uniform previously, and then the liquid containing microorganism, nutrients etc. is injected into the soil. As the coefficient of permeability of soil, there are the coefficient of saturated permeability determined by the constant head permeability method or variable head permeability method, the field coefficient of permeability determined by Piezometer method, Tube method, Auger-hole method or Dry Auger-hole method, and the coefficient of unsaturated permeability. In the present invention, any one of the coefficients can be employed.

In order to control the coefficient of permeability of the soil to be remedied, the following two methods can be used.

The first one is to increase the smaller coefficient of permeability of the soil, and the second one is to decrease the larger coefficient of permeability of the soil.

The second one is preferably employed for the present invention, since it is easy to control the diffusion of the injected substances in the soil, and consequently, it can prevents the diffusion of such substances over the unexpected areas of the soil.

Figure 1:
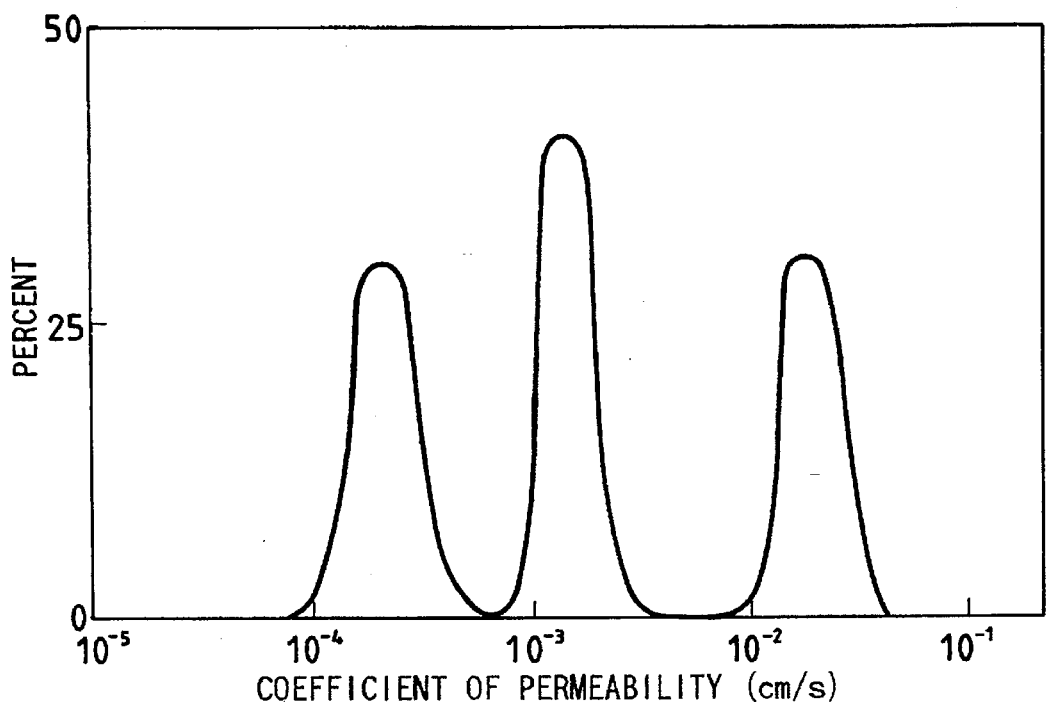
FIG. 1 is a graph which shows the distribution of coefficient of permeability of the soil before processing in Example 3.
Figure 2:
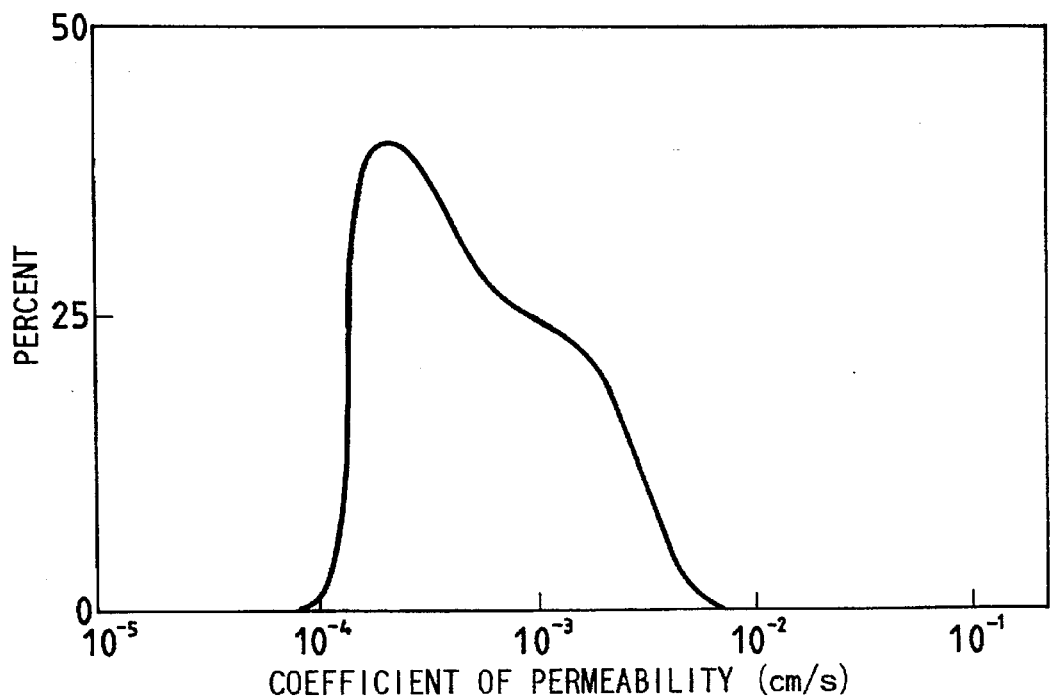
FIG. 2 is a graph which shows the distribution of controlled coefficient of permeability of the soil after processing in Example 3.

Specifically when plural peaks are present in the distribution of the coefficient of permeability of the soil to be remedied, as is shown in FIG. 1, preferably the coefficient of permeability is controlled so that the peak at the substantially smallest coefficient of permeability (the center of the peak is about $3.0 \times 10^{-4}$ cm/S in FIG. 1) (see FIG. 1) will comprise the largest percentage in the distribution of coefficient of permeability (as is shown in FIG. 2).

The uniform distribution of the injected substances can be realized by making the coefficient of permeability of the whole soil equal to that of the soil portion where the diffusion of the injected substances is most difficult.

Here, "the peak at the substantially smallest coefficient of permeability", means the peak at the smallest value of coefficient of permeability among the peaks each comprising a significant percentage in the distribution pattern of the permeability coefficient of a certain area of soil to be remedied.

For example, when a very small portion of the polluted soil to be remedied has a coefficient of permeability to form a peak comprising an insignificantly small percentage in the distribution of coefficient of permeability, the pollution of such an portion of the soil may be insignificant and out of consideration. In other words, the coefficient of permeability of such a portion of the soil does not matter.

Although the actual percentage to be significant depends on the degree of needed remediation, preferably "the peak at the substantially smallest coefficient of permeability" is considered a peak at the smallest coefficient of permeability among the peaks that comprise 10% or more in the total distribution of coefficient of permeability, more preferably 8% or more, and most preferably 5% or more. For uniform distribution of the injected substances in a defined area of soil to be remedied can be realized under the above-mentioned conditions.

An actual process for controlling the coefficient of permeability is as follows. A particle dispersion is injected into soil, this fluid is necessarily introduced into the parts of the soil having larger coefficients of permeability. And the value of the coefficient of permeability decrease because voids in the soil are filled with injected particles. Consequently, the reduction of the coefficient of permeability, after injection is completed, is greater where the coefficient of permeability before the injection of a dispersed system was large, and the soil having uniform coefficient of permeability is obtained. Soil remediation using a microorganism can be done very efficiently after this treatment process. Specifically, when a microorganism and substances for maintaining the decomposing activity of the microorganism are injected into such soil, the injected materials will uniformly distribute from a injection well because the coefficient of permeability of the soil is uniform. The extent of the injection (distance from the injection well) substantially depends on the total volume of injected materials, injection time, pressure applied for injection, and flow of injected materials; therefore by controlling the above factors it is possible to inject substances exclusively into the limited area of soil.

When the coefficient of permeability is made uniform by injecting suspended particles from an injection well, both particles of the same and different diameters are applicable. When the particles of the same diameter are employed, the optimum size of the particles is determined according to the coefficient of permeability of the soil to be processed. Generally the size of the injected particles are within the range of 1 μm to 3 mm, for example, for the soil of which coefficient of permeability is $1 \times 10^{-3}$ cms$^{-1}$, particles of about 10 μm to 1 mm diameter are employed, preferably particles of about 0.1 mm are employed. Particles of smaller diameter are advantageously utilized for the soil having smaller coefficient of permeability, because the average size of the voids of such soil are also small. Also useful is a process in which particles of different sizes are injected at a time or one after another because soil is generally very heterogeneous and consequently the size of the voids is in a wide range. Specifically soil having uniform coefficients of permeability as a whole can be obtained by firstly filling the larger voids with larger particles and then by filling smaller voids, which may result from the preceding treatment or originally exist, with smaller particles. For this processing, the sizes of the injected particles are within the range of 1 μm to 3 mm. For example, for the processing of soil of which coefficient of permeability is $1 \times 10^{-3}$ cms$^{-1}$, particles of 10 μm to 1 mm diameter are utilized, preferably particles of about 0.1 mm or less. Particles of smaller diameter are advantageously utilized for the soil having smaller coefficient of permeability, because the average size of the voids of such soil are also small.

Particles which are applicable to the above treatment include various solids and gels used in chemical, medical and pharmaceutical and food industries, waste water treatment system and so on. For example, particles such as classified sand and soil, porous glass, ceramics, metal oxides, active carbon, kaolinire, bentonire, zeolite, silica gel, alumina, anthracite and cement; gel particles such as starch, agar, chitin, chitosan, polyvinyl alcohol, alginic acid, polyacrylamide, carrageenan, agarose and gelatin; natural or synthetic polymers such as water glass, cellulose, glutaric aldehyde, polyacrylic acid, polyurethane, polyester, poly (vinylpyrrolidone) and N-vinyl-2-pyrrolidone, and so on. The particles of suitable size are selected, and dispersed in water or a polymer aqueous solution, and then injected. The mixture of the above particles is also applicable.

Microbial remediation of soil can be conducted very efficiently after this treatment process. Specifically, when a microorganism and substances for maintaining the decomposing activity of the microorganism are injected into such soil, the injected materials will uniformly diffuse from an injection well because the coefficient of permeability of the soil is uniform. By controlling the total volume of injected materials, injection time, pressure applied for injection, and flow of injected materials, it is possible to inject substances exclusively into the determined area of soil.

In case of utilizing a native microorganism which dwells in the soil for decomposing pollutants, substance to be injected is at least either of the nutrients for the growth of the microorganism and the inducer for the expression of the decomposing activity in the microorganism.

In case of utilizing a foreign microorganism, the microorganism as well as the above substances is injected.

As is described above, according to one embodiment of the present invention, the remediation of the polluted soil can be conducted efficiently by processing a certain soil area to be remedied for uniform permeability coefficient before the remediation process.

According to another embodiment of the present invention, the coefficient of permeability of a soil area to be remedied is adjusted so that the peak at the substantially smallest coefficient of permeability may comprise the largest percentage in the distribution of coefficient of permeability of the soil, which enables the efficient remediation of the polluted soil without excess injection of the microorganism, nutrients and the inducer.

According to the embodiment of the present invention, it is also avoidable that injected substances escape from a determined area of the soil to be remedied, because the diffusion extent of the injected substances from the injection well can be controlled.

Hereinafter the present invention will be described in terms of its preferred examples, but those examples are not intended to limit the present invention.

The coefficients of water permeability used in the following Examples and Comparative Example was determined by the constant head permeability method according to German Industrial Standards JSF T311-1990.

EXAMPLE 1

A process for making the coefficient of permeability of soil uniform by injecting a dispersion of particles of the same size A rough sand of average diameter 1 mm, a fine sand of average diameter 0.5 mm and a silty fine sand of average diameter 0.1 mm were mixed roughly to fill an acrylic container of 1 m×1 m×1 m. The coefficient of permeability of the soil in the container was measured at 5 points around the injection opening.

Then a stainless injection tube of outer diameter 10 mm and inner diameter 8 mm was inserted into the soil at the center of the container lid so that one end of the tube would reach at a depth of 50 cm. The other end of the injection tube was connected to a feeding pump via a valve so that the injection liquid in a tank could be supplied to an injection opening applying pressure.

A fine sand was classified to obtain particles of average diameter about 0.1 mm. The above particles (250 g) were suspended in 5 liter of water, and the dispersion was supplied to the above soil applying pressure through the feeding pump at a flow rate of 1 l/min with stirring to prevent the particle sedimentation. After injection was completed, five samples were taken from the soil around the injection opening and the coefficient of permeability of each sample was determined.

The mean and standard deviation of the coefficient of permeability of the soil before and after the injection treatment are shown in Table 1. The data shows that the coefficient of permeability of the soil distributed in a wide range can be diminished as a whole and made more uniform (reduction of the standard deviation) by the injection of a dispersion of particles of the same size.

EXAMPLE 2

A process for making the coefficient of permeability of soil uniform by injecting a dispersion of particles of different size As in Example 1, the acrylic container was filled with a soil sample, and the injection tube and the feeding pump were provided.

Fine sand was classified into particles of average diameter about 10 μm, 20 μm, 50 μm and 0.1 mm. Each of the above particles (60 g) was suspended in 1.25 l of water, and each dispersion was fed to the above soil in order of particle size (the larger, the earlier) applying pressure with the feeding pump at a flow rate of 1 l/min with stirring to prevent the particle sedimentation. After injection was completed, 5 samples were taken from the soil around the injection opening and the coefficient of permeability of each sample was determined.

The mean and standard deviation of coefficient of permeability of the soil before and after the injection treatment are shown in Table 1.

The data shows that the coefficient of permeability of the soil distributed in a wide range can be diminished as a whole and made more uniform (reduction of the standard deviation) by the injection of a dispersion of particles of various size.

It is also found that the process of this example is more effective than that of Example 1 in making coefficient of permeability of the soil uniform.

TABLE 1

Variation of coefficient of permeability of the soil before and after the injection treatment

| | Coefficient of permeability (cm.s$^{-1}$) | | |
|---|---|---|---|
| | Before the injection | After the injection of particles of the same size (Example 1) | After the injection of particles of the different size (Example 2) |
| Average value | 5.6 × 10$^{-3}$ | 2.7 × 10$^{-3}$ | 2.0 × 10$^{-3}$ |
| Standard deviation | 4.0 × 10$^{-3}$ | 1.2 × 10$^{-3}$ | 8.2 × 10$^{-4}$ |

EXAMPLE 3

A process for making the coefficient of permeability of soil uniform by injecting a dispersion of particles of the same size A model sample soil similar to real soil having various coefficient of permeability, was prepared in an acrylic container of 1 m×1 m×1 m by laying rough sand (average diameter 1 mm) 30 cm thick, fine sand (average diameter 0.5 mm) 40 cm thick, and silt (average diameter 0.1 mm) 30 cm thick, in this order. Then the distribution of coefficient of permeability of the sample soil was determined. The distribution of coefficient of permeability of the soil prepared in this example is shown in FIG. 1.

Then a stainless injection tube of outer diameter 10 mm and inner diameter 8 mm was inserted into the soil at the center of the container lid so that the end of the tube would reach at a depth of 50 cm. The other end of the injection tube was connected to a feeding pump via a valve so that the injection liquid in a tank could be supplied to an injection opening applying pressure.

A fine sand was classified to obtain particles of average diameter about 0.1 mm. The above particles (250 g) were suspended in 5 liter of water, and the dispersion was supplied to the above soil applying pressure through the feeding pump at a flow rate of 1 l/min with stirring to prevent the particle sedimentation.

After injection was completed, the distribution of coefficient of permeability of the soil was again determined. The results are shown in FIG. 2. The coefficient of permeability of the soil was controlled so that the peak at the smallest coefficient of permeability (the center of the peak is about 3.0×10$^{-4}$ cm/s) in FIG. 1 comprised the largest percentage in the distribution of coefficient of permeability in FIG. 2.

EXAMPLE 4

A process for making the coefficient of permeability of soil uniform by injecting a dispersion of particles of different size As is described in Example 3, a model sample soil was used to fill an acrylic container, and an injection tube and a supplying pump were provided.

Fine sand was classified into particles of average diameter about 10 μm, 20 μm, 50 μm and 0.1 mm. Each of the above particles (60 g) was suspended in 1.25 l of water, and each dispersion was fed to the above soil in order of particle size (the bigger, the earlier) applying pressure through the feeding pump at a flow rate of 1 l/min with stirring to prevent the particle Sedimentation. After injection was completed, the distribution of coefficient of permeability of the sample soil was determined. The results are shown in FIG. 3.

As seen from FIG. 1 and FIG. 3, the coefficient of permeability of the soil was controlled so that the peak at the smallest coefficient of permeability (the center of the peak is about $3.0 \times 10^{-4}$ cm/s), comprised the largest percentage in the distribution of coefficient of permeability.

EXAMPLE 5

An efficient soil remediation at a defined and uniform soil area using a microorganism As is described in Example 3, a model sample soil was prepared and to fill an acrylic container.

Then an aqueous trichloroethylene solution was sprinkled on the soil to obtain a polluted soil of which trichloroethylene concentration is 10 ppm. Then an injection tube and a supplying pump were provided in the same manner as in Example 3.

Then in the same manner as in Example 3, 250 g of the particles of average diameter about 0.1 mm were suspended in 5 l of water, and the solution was fed to the above soil applying pressure through the feeding pump at a flow rate of 1 l/min with stirring to prevent the particles sedimentation. Thus the coefficient of permeability of the soil was controlled and the distribution of coefficient of permeability was determined. The permeability coefficient distribution was controlled so that the peak at substantially the smallest coefficient of permeability comprises about 40% in the distribution of coefficient of permeability, as shown in FIG. 2.

At the same time Corynebacterium sp. J1 (Deposit No. FERM P-14332 in National Institute of Bioscience and Human Technology, Agency of Industrial Science and Technology) was cultured and multiplied to the cell concentration of $10^8$ cell/ml. Meanwhile, a solution containing 0.1% of yeast extract, 0.2% of sodium lactate and 100 ppm of phenol was prepared and aerated with oxygen gas to saturate with oxygen, which was used as an injection solution. Then a mixture of the above microorganism and the above injection solution in the ratio of 1:1000 (volume) was made and injected into the soil which had been subjected to processed to control the coefficient of permeability, through the injection tube at a flow rate of 1 l/min for 5 minutes. As a result of the remediation test, trichloroethylene content of the soil within 50 cm from the end of the injection tube was reduced to about 1 ppm after 2 days. On the other hand, trichloroethylene concentration of the soil at about 80 cm from the end of the injection tube was maintained at about 10 ppm after 2 days. Thus it is found that only a defined area of soil having uniform coefficient of permeability was efficiently remedied.

Comparative Example 1

Soil remediation was conducted in the same manner as in Example 3 except that the coefficient of permeability was not controlled.

As a result, trichloroethylene concentration of the soil within 50 cm from the end of the injection tube varied from about 1 to 10 ppm according to the measuring points. This means that trichloroethyiene in some part of the soil was decomposed and that in other part of the soil was not decomposed, that is, distribution of the microorganism was not uniform when the coefficient of permeability was not controlled.

What is claimed is:

1. A process for remedying soil polluted with a pollutant using a microorganism, comprising the steps of:

(a) decreasing a coefficient of permeability of the polluted soil; and b) introducing into the polluted soil having the decreased coefficient of permeability, a substance selected from the group consisting of a microorganism capable of decomposing the pollutant, a nutrient for a microorganism capable of decomposing the pollutant and an inducer for expressing an enzymic activity for decomposing the pollutant in a microorganism, wherein step (a) is conducted to permit the substance introduced into the soil to be uniformly distributed over a soil area to be remedied.

2. The process according to claim 1, wherein the controlling step is conducted by injecting the soil with a particle dispersion.

3. The process according to claim 2, wherein the particles are almost uniform in diameter.

4. The process according to claim 2, wherein the particles are different in diameter.

5. The process according to claim 4, wherein larger particles are injected before smaller ones are injected.

6. The process according to claim 2, wherein the particles are solid or gel.

7. The process according to claim 2, wherein the medium of the dispersion is water.

8. A process for microbial remediation of an environment having soil polluted with a pollutant comprising the steps of:

providing an environment to be remedied wherein the polluted soil has plural peaks in its coefficient of permeability distribution, controlling permeability of the soil so that a peak at the substantially smallest coefficient of permeability occupies the largest percentage in the distribution of coefficient of permeability of the soil;

supplying a substance selected from the group consisting of a microorganism capable of decomposing the pollutant, a nutrient for a microorganism capable of decomposing the pollutant and an inducer for expressing an activity for decomposing the pollutant in a microorganism capable of decomposing the pollutant, to the polluted soil of which coefficient of permeability has already been controlled.

9. A process for treating soil comprising the steps of:

providing a soil area to be remedied containing soil polluted with a pollutant and consequently needing remediation, said soil having plural peaks in the distribution of its coefficient of permeability, and controlling permeability of the soil so that a peak at the substantially smallest coefficient of permeability occupies the largest percentage in the distribution of coefficient of permeability.

10. The process according to claim 8, wherein the controlling step is conducted by injecting the soil with a particle dispersion.

11. The process according to claim 10, wherein the particles are substantially uniform in diameter.

12. The process according to claim 10, wherein the particles are different in diameter.

13. The process according to claim 12, wherein larger particles are injected before smaller ones are injected.

14. The process according to claim 10, wherein the particles are solid or gel.

15. The process according to claim 10, wherein the medium of the dispersion is water.

16. The process according to claim 9, wherein the controlling step is conducted by injecting the soil with a particle dispersion.

17. The process according to claim 16, wherein the particles are substantially uniform in diameter.

18. The process according to claim 16, wherein the particles are different in diameter.

19. The process according to claim 18, wherein larger particles are injected before smaller ones are injected.

20. The process according to claim 16, wherein the particles are solid or gel.

21. The process according to claim 16, wherein the medium of the dispersion is water.

22. In a process for remedying an environment comprising soil polluted with a pollutant using a microorganism by introducing into the polluted soil a substance selected from the group consisting of a microorganism capable of decomposing the pollutant, a nutrient for a microorganism capable of decomposing the pollutant and an inducer for expressing an enzymic activity for decomposing the pollutant in a microorganism, the improvement which comprises:

controlling a coefficient of permeability of the polluted soil by injecting the soil with a particle dispersion so that the substance introduced into the soil is uniformly distributed over a soil area to be remedied.

23. The process according to claim 22, wherein the particles are substantially uniform in diameter.

24. The process according to claim 22, wherein the particles are different in diameter.

25. The process according to claim 24, wherein larger particles are injected before smaller ones are injected.

26. The process according to claim 22, wherein the particles are solid or gel.

27. The process according to claim 22, wherein the medium of the dispersion is water.

* * * * *